United States Patent [19]

Terada

[11] Patent Number: 4,941,587
[45] Date of Patent: Jul. 17, 1990

[54] FUEL TANK SYSTEM

[75] Inventor: Yoshinobu Terada, Tochigi, Japan

[73] Assignee: Honda Giken Kogyo Kabushiki Kaisha, Tokyo, Japan

[21] Appl. No.: 359,898

[22] Filed: Jun. 1, 1989

[30] Foreign Application Priority Data

Jun. 6, 1988 [JP] Japan .................. 63-74857

[51] Int. Cl.$^5$ .................. B65D 6/12; B65D 6/40
[52] U.S. Cl. .................. 220/85 VS; 220/86 R; 220/85 F
[58] Field of Search .............. 220/85 F, 85 SP, 86 R, 220/85 VS

[56] References Cited

U.S. PATENT DOCUMENTS

| | | |
|---|---|---|
| 3,907,153 | 9/1975 | Mutty . |
| 4,630,749 | 12/1986 | Armstrong et al. ............ 220/85 VS |
| 4,719,949 | 1/1988 | Mears ............... 220/85 VS |
| 4,747,508 | 5/1988 | Sherwood ............... 220/85 VS |
| 4,765,504 | 8/1988 | Sherwood et al. ............ 220/85 VS |
| 4,809,863 | 3/1989 | Woodcock et al. ............ 220/85 F |

FOREIGN PATENT DOCUMENTS 60-199731 9/1985 Japan .
61-93320 6/1986 Japan .
61-127025 8/1986 Japan .

*Primary Examiner*—Joseph Man-Fu Moy
*Attorney, Agent, or Firm*—Armstrong, Nikaido, Marmelstein, Kubovcik & Murray

[57] ABSTRACT

A fuel tank system includes a fuel tank, a fuel filler pipe connected to the fuel tank, a shutter assembly disposed in the fuel filler pipe, the shutter assembly being openable by a refueling nozzle to be inserted into the fuel filler pipe, a guide disposed in the fuel filler pipe for guiding the inserted refueling nozzle toward the shutter assembly, an engagement member disposed in the fuel filler pipe and angularly movable through a constant angle by being engaged by the refueling nozzle inserted in the fuel filler pipe and guided to the shutter assembly, and a fuel vapor venting mechanism including an on-off valve responsive to the angular movement of the engagement member for providing fluid communication between the fuel tank and an associated mechanism such as a canister. The engagement member is positioned between the guide and the shutter assembly. The on-off valve is slidable on a cylindrical surface which has a plurality of raised stripes or ridges extending axially for allowing the on-off valve to slide smoothly and also for permitting fuel vapors to flow in a large amount when the on-off valve is opened.

11 Claims, 2 Drawing Sheets

FUEL TANK SYSTEM

BACKGROUND OF THE INVENTION

1. Field of the Invention:

The present invention relates to a fuel tank system, and more particularly to a fuel tank system for use on a motor vehicle such as an automobile, the fuel tank having a fuel vapor venting mechanism for smoothly guiding fuel vapors in the fuel tank toward an associated mechanism such as a canister when the fuel tank is refueled.

2. Description of the Relevant Art:

Sealed fuel tanks always have air spaces above the fuel level therein which are filled with fuel vapors. When fuel is supplied into a fuel tank, fuel vapors are fed from the fuel tank to an associated mechanism such as a canister for vapor storage.

Japanese Laid-Open Utility Model Publication No. 61-93320 discloses a fuel tank system coupled to a canister. The disclosed fuel tank system includes a fuel filler pipe connected to a fuel tank and having therein a guide for guiding a refueling nozzle and a swingable shutter. The fuel tank is connected to a canister through a fuel vapor venting pipe which has a valve therein. When the refueling nozzle is inserted into the fuel filer pipe to cause the shutter to swing, the valve in the fuel vapor venting pipe is moved an interval corresponding to the angle through which the valve swings. The fuel vapor venting pipe is now opened to allow fuel vapors to enter the canister.

Since the interval of movement of the valve varies depending on the angle of swinging movement of the shutter, when the shutter swings a smaller angle owing, for example, to the refueling nozzle failing to be fully inserted, the valve moves a correspondingly smaller interval, thus reducing the opening of the fuel vapor venting pipe. Under such a condition, the resistance presented by the fuel vapor venting pipe to the flow of fuel vapors therethrough is increased, and the fuel tank may not be smoothly refueled.

SUMMARY OF THE INVENTION

In view of the aforesaid drawback of the conventional fuel tank system, it is an object of the present invention to provide a fuel tank system which can smoothly be refueled regardless of the angle through which a shutter in a fuel filler pipe is angularly moved.

According to the present invention, there is provided a fuel tank system comprising a fuel tank, a fuel filler pipe connected to the fuel tank, a shutter assembly disposed in the fuel filler pipe, the shutter assembly being openable by a refueling nozzle to be inserted into the fuel filler pipe, a guide disposed in the fuel filler pipe for guiding the inserted refueling nozzle toward the shutter assembly, an engagement member disposed in the fuel filler pipe and angularly movable through a constant angle by being engaged by the refueling nozzle inserted in the fuel filler pipe and guided to the shutter assembly, and a fuel vapor venting mechanism including an on-off valve responsive to the angular movement of the engagement member for providing fluid communication between the fuel tank and an associated mechanism. The engagement member is positioned between the guide and the shutter assembly.

According to the present invention, there is also provided a fuel vapor venting mechanism for venting fuel vapors from a fuel tank to a canister when the fuel tank is refueled, comprising a disc-shaped on-off valve movable axially in response to the refueling of the fuel tank, the onoff valve having an outer peripheral conical taper surface, and a casing having a first cylindrical portion defining therein a first space communicating with the fuel tank, the on-off valve being slidable in the first space, a second cylindrical portion defining therein a second space communicating with the canister, the second cylindrical portion being smaller in diameter than the first cylindrical portion, and a closing cylindrical portion connecting the first and second cylindrical portions to each other and having an inner peripheral conical taper surface progressively reduced in diameter from the first space toward the second space and complementary in shape to the outer peripheral conical taper surface of the on-off valve, the on-off valve being axially slidably movable from the closing cylindrical portion into the first space in the first cylindrical portion in response to the refueling of the fuel tank, the first space being defined by an inner peripheral surface of the first cylindrical portion which has thereon a plurality of raised stripes extending in an axial direction of the first cylindrical portion and held in slidable contact with an outermost peripheral surface of the on-off valve at circumferentially spaced locations thereon.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
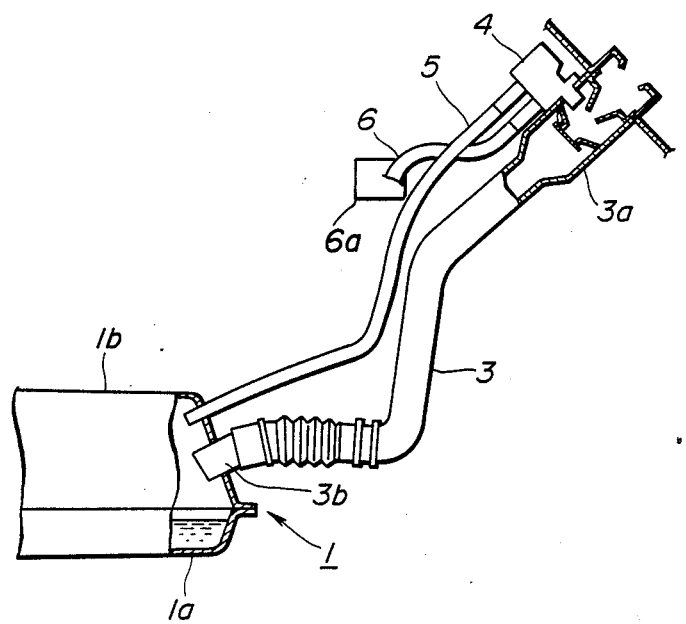
FIG. 1 is a fragmentary side elevational view, partly in cross section, of a fuel tank system according to the present invention.
Figure 3:
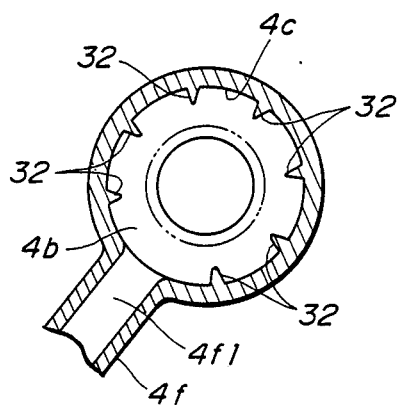
FIG. 3 is a cross-sectional view of a casing, taken along line 3—3 of FIG. 4.

FIG. 1 fragmentarily shows a fuel tank system according to the present invention.

The fuel tank system includes a fuel tank 1 comprising an upper housing member 1a and a lower housing member 1b. A fuel filler pipe 3 extends obliquely upwardly from one side of the fuel tank 1. The fuel filler pipe 3 has a proximal end 3b opening into and connected to the fuel tank 1 and a larger-diameter open distal end 3a. A casing 4 housing a fuel vapor venting mechanism (described later on) is mounted on an outer circumferential surface of the distal end 3a of the fuel filler pipe 3.

Two pipes 5, 6 are joined at ends thereof to the casing 4. The other end of the pipe 5 opens into and is connected to an upper portion of the fuel tank 1, and the other end of the pipe 6 communicates with an associated mechanism such as a canister (not shown).

Figure 2:
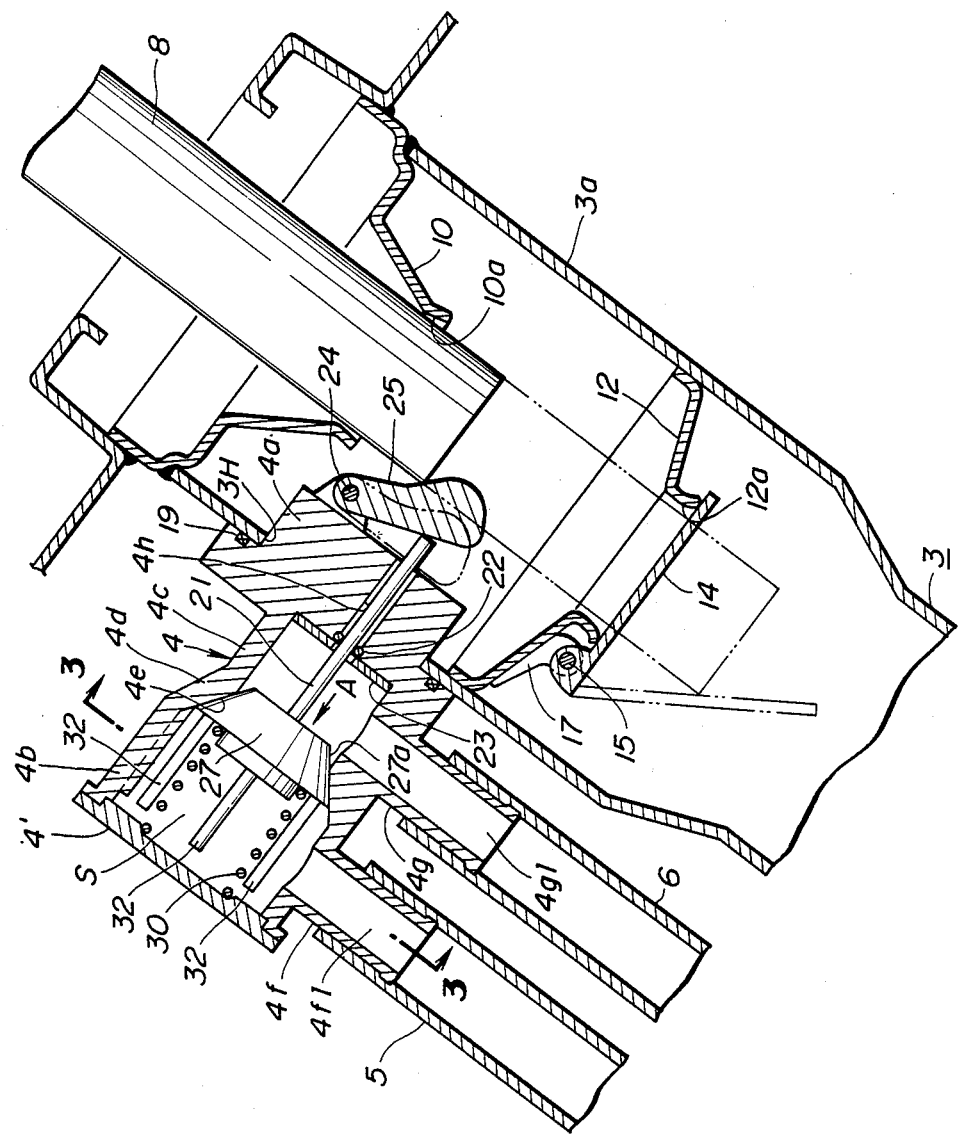
FIG. 2 is an enlarged fragmentary vertical cross-sectional view of the distal end of a fuel filler pipe of the fuel tank system.

FIG. 2 shows in vertical cross section the distal end 3a of the fuel filler pipe 3 and the casing 4.

As illustrated in FIG. 2, the distal end 3a houses a guide 10 for guiding a refueling nozzle 8 which is inserted from outside into the fuel filler pipe 3. The guide 10 is of a tapered conical shape which is progressively tapered or reduced in diameter inwardly of the fuel filler pipe 3. The guide 10 has a central guide hole 10a having a flange extending slightly axially and a diameter which is substantially the same as the outside diameter of the refueling nozzle 8.

The distal end 3a of the fuel filer pipe 3 also accommodates therein a shutter assembly disposed downwardly of the guide 10 for fully closing the fuel filler pipe 3, the shutter assembly including a support 12 fixedly secured to an inner peripheral wall surface of the fuel filler pipe 3 and a shutter 14 swingably mounted on the support 12. The support 12 has a central hole 12a having a diameter which is substantially equal to the outside diameter of the refueling nozzle 8. The shutter 14 is swingably attached to a lower surface of the support 12 by a hinge pin 15 for swinging movement within the fuel filler pipe 3 just underneath the support 12. The shutter 14 is normally urged to close the hole 12a by means of a spring 17.

The distal end 3a has a hole 3H defined in a wall thereof extending between the guide 10 and the shutter assembly. The casing 4 has a boss 4a fitted in the hole 3H with a rubber seal 19 interposed between a stepped surface of the boss 4a and an outer surface of the distal end 3a.

The casing 4 defines therein a substantially cylindrical space S having its axis extending in a direction normal to the axis of the distal end 3a of the fuel filler pipe 3. The casing 4 generally includes a larger-diameter cylindrical portion 4b, a smaller-diameter cylindrical portion 4c smaller in diameter than the larger-diameter portion 4b, and an intermediate portion 4d lying between the larger- and smaller-diameter portions 4b, 4c. These portions 4b, 4c, 4d have respective cylindrical spaces defined therein and having corresponding diameters, the cylindrical spaces being combined into the cylindrical space S. The intermediate portion 4d has an inner peripheral conical taper surface 4e with its diameter progressively reduced from the larger-diameter portion 4b toward the smaller-diameter portion 4c. The casing 4 also has two nipples 4f, 4g on a side surface thereof over which the ends of the pipes 5, 6 are fitted. The nipple 4f has a passage 4f1 through which the space in the larger-diameter portion 4b communicates with the interior space of the pipe 5. The nipple 4g has a passage 4g1 through which the space in the smaller-diameter portion 4c communicates with the interior space of the pipe 6. In the illustrated embodiment, the casing 4 which includes the boss 4a and the nipples 4f, 4g is constructed as an integral unitary body. The upper open end of the space S which is remote from the boss 4a is completely closed off by a cover 4'.

A substantially disc-shaped on-off valve 27 is slidably fitted in the space in the larger-diameter portion 4b. The on-off valve 27 has an outer peripheral conical taper surface 27a complementary to the inner peripheral conical taper surface 4e of the intermediate portion 4d. When the on-off valve 27 is in the illustrated position with the conical taper surfaces 27a, 4e held against each other, the space in the larger-diameter portion 4b and the space in the smaller-diameter portion 4c are held out of communication with each other. A compression coil spring 30 is disposed under compression in the space in the larger-diameter portion 4b between the cover 4' and the on-off valve 27 for normally urging the outer peripheral conical taper surface 27a into contact with the inner peripheral conical taper surface 4e.

The on-off valve 27 has a push rod 21 extending from its bottom facing the smaller-diameter portion 4c through the space S and a through hole 4h defined in the boss 4a into the fuel filler pipe 3. The push rod 21 is axially slidable in the boss 4a. A lever 25 is angularly movably mounted on the bottom surface of the boss 4a which faces into the fuel filler pipe 3. The push rod 21 has a distal end engaging the back of the lever 25. The refueling nozzle 8, when inserted into the fuel filler pipe 3, is guided through the guide hole 10a into the hole 12a of the shutter assembly as indicated by the imaginary lines in FIG. 2. The lever 25 can be angularly displaced into the way of the refueling nozzle 8 by the push rod 21 as indicated by the solid lines. Since the on-off valve 27 is normally closed by the spring 30, the lever 25 is usually angularly displaced by the distal end of the push rod 21 into the way of the fuel filler pipe 8.

A rubber seal 22 is disposed at one end of the through hole 4h near the smaller-diameter portion 4c and extends around the push rod 21. The rubber seal 22 is covered with a cover plate 23 disposed on the bottom of the space in the smaller-diameter portion 4c.

When the refueling nozzle 8 is inserted into the fuel filler pipe 3, the tip end of the refueling nozzle 8 first moves through the guide hole 10a of the guide 10 and then engages the lever 25, after which the outer peripheral surface of the refueling nozzle 8 is held in sliding contact with the lever 25. The lever 25 is thus angularly displaced outwardly, i.e., toward the casing 4, against the bias of the spring 30 which acts through the on-off valve 27 and the push rod 21. Continued insertion of the refueling nozzle 8 causes the tip end of the nozzle 8 to engage and turn the shutter 14 into the open position as indicated by the imaginary lines in FIG. 2.

When the refueling nozzle 8 is fully inserted, it is kept in place within the fuel filler pipe 3 by being supported in the guide hole 10a and the hole 12a. Therefore, the lever 25 held in sliding contact with the outer peripheral surface of the nozzle 8 is always swung in a constant angular range. As a result, the on-off valve 27 is moved by the push rod 21 over a corresponding distance in the direction indicated by the arrow A within the space in the larger-diameter portion 4b of the casing 4, thus disengaging the conical taper surfaces 27a, 4e from each other. The spaces in the larger-diameter portion 4b and the smallerspaces in the larger-diameter portion 4c are now in fluid communication with each other. Consequently, the interior space of the fuel tank 1 is held in fluid communication with the canister through the pipes 5, 6 and the interior space S of the casing 4.

At the same time, fuel can be supplied from the refueling nozzle 8 into the fuel filler pipe 3. Fuel vapors filled in the space above the fuel level in the fuel tank 1 are allowed to flow through the pipe 5, the passage 4f1, the larger-diameter portion 4b, the intermediate portion 4d, the smaller-diameter portion 4c, the passage 4g1, and the pipe 6 into the canister for storage.

The larger-diameter portion 4b has on its cylindrical inner peripheral surface a plurality of circumferentially spaced raised stripes or ridges 32 extending in the direction in which the on-off valve 27 is slidable and held in slidable contact with the outermost peripheral surface of the on-off valve 27 at circumferentially spaced locations thereon. When the on-off valve 27 is axially slid, since it moves on the raised stripes 32, the on-off valve 27 is smoothly moved without much frictional resistance. The amount of fuel vapors passing through the space in the larger-diameter portion 4b is not substantially reduced by the raised stripes 32 as their cross-sectional area is small.

With the present invention, the position of the refueling pipe 8 in the fuel filler pipe 3 is determined solely by the guide hole 10a and the hole 12a while the fuel tank 1 is being refueled. Because the lever 25 is positioned between the guide 10 and the shutter 14, the lever 25 is allowed to swing through a constant angle in sliding engagement with the outer peripheral surface of the nozzle 8 without being affected by the angle of swinging movement of the shutter 14. Therefore, the on-off valve 27 is moved a constant interval or distance thereby permitting the fuel tank 1 to be refueled smoothly and reliably.

The casing 4 and the lever 25 are preassembled with each other. When the fuel tank system is assembled, attention may be directed to only the dimensional accuracies of the boss 4a and the hole 3H of the fuel filler pipe 3. Therefore, the fuel tank system can be manufactured with ease.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

I claim:

1. a fuel tank system comprising:
   a fuel tank;
   a fuel filler pipe connected to said fuel tank for insertion of a refueling nozzle to refuel said tank;
   a guide member disposed in said fuel filler pipe, said guide member having a central hole of a diameter for insertion of said refueling nozzle;
   a shutter assembly disposed in said fuel filler pipe spaced from said guide member, said shutter assembly having a central hole of a diameter for insertion of said refueling nozzle and a shutter operable by a refueling nozzle inserted into the fuel filler pipe through said guide member central hole and said shutter assembly central hole;
   an engagement member disposed in said fuel filler pipe and angularly movable through a constant angle by being engaged by the refueling nozzle inserted in said fuel filler pipe and extending from said guide member to said shutter assembly; and
   a fuel venting mechanism including an on-off valve responsive to the angular movement of said engagement member for providing fluid communication between said fuel tank and an associated mechanism.

2. A fuel tank system according to claim 1, wherein said engagement member is positioned between said guide member and said shutter assembly.

3. A fuel tank system according to claim 1, wherein said fuel tank venting mechanism comprising a casing mounted on said fuel filler pipe at a position between said guide member and said shutter assembly and having a boss disposed in said fuel filler pipe, said casing defining therein a space axially extending in a direction normal to the axis of said fuel filler pipe, said on-off valve being slidably disposed in said space in said casing and having a push rod extending coaxially with said space and slidably through said boss into said fuel filler pipe, said engagement member comprising a lever swingably mounted on said boss for angular movement to push said push rod in response to engagement by an outer peripheral surface of the refueling nozzle.

4. A fuel tank system according to claim 3, wherein said casing comprises a first portion communicating with said fuel tank and defining therein a first space in which said on-off valve is slidably fitted, a second portion defining therein a second space communicating with said associated mechanism, and an intermediate portion connecting said first and second portions to each other and defining therein a closing space in which said on-off valve is positionable to keep said first and second spaces out of fluid communication with each other.

5. A fuel tank system according to claim 4, wherein said on-off valve comprises a disc-shaped member, said first space in said first portion being defined by a cylindrical inner peripheral surface having thereon a plurality of raised stripes extending in said normal direction and held in slidable contact with an outer peripheral surface of said on-off valve at circumferentially spaced locations thereon.

6. A fuel tank system according to claim 5, wherein said second space in said second portion comprises a cylindrical space smaller in diameter than said first space, said closing space in said intermediate portion being defined by a conical taper surface progressively reduced in diameter from said first space toward said second space, said on-off valve having an outer peripheral conical taper surface complementary in shape to said conical taper surface of said intermediate portion.

7. A fuel tank system according to claim 6, wherein said fuel vapor venting mechanism further includes urging means for normally urging said outer peripheral conical taper surface of said on-off valve toward said conical taper surface of said intermediate portion to bring said first and second spaces out of fluid communication with each other.

8. A fuel tank system according to claim 3, wherein said engagement member and said fuel vapor venting mechanism are combined into an assembly which is disposed on said fuel filler pipe between said guide member and said shutter assembly with a rubber sealing interposed between said assembly and said fuel filler pipe.

9. A fuel tank system according to claim 1, wherein said associated mechanism comprises a canister for storing fuel vapors supplied from said fuel tank.

10. A fuel vapor venting mechanism for venting fuel vapors from a fuel tank to a canister when the fuel tank is refueled, comprising:
   a disc-shaped on-off valve movable axially in response to the refueling of the fuel tank, said on-off valve having an outer peripheral conical taper surface; The casing 4 also has two nipples 4f, 4g on a side surface
   a casing having a first cylindrical portion defining therein a first space communicating with the fuel tank, said on-off valve being slidable in said first space, a second cylindrical portion defining therein a second space communicating with the canister, said second cylindrical portion being smaller in diameter than said first cylindrical portion, and a closing cylindrical portion connecting said first and second cylindrical portions to each other and having an inner peripheral conical taper surface progressively reduced in diameter from said first space toward said second space and complementary in shape to said outer peripheral conical taper surface of said on-off valve; and said on-off valve being axially slidably movable from said closing cylindrical portion into said first space in said first cylindrical portion in response to the refueling of the fuel tank, said first space being defined by an inner peripheral surface of said first cylindrical portion which has thereon a plurality of raised stripes extending in a axial direction of the first cylindrical portion and held in slidable contact with an outermost peripheral surface of said on-off valve at circumferentially spaced locations thereon for achieving smooth axial movement of the on-off valve therein.

11. A fuel vapor venting mechanism according to claim 10, further comprising engagement lever means including a lever angularly movable through a constant angle by engagement with a refueling nozzle when the fuel tank is refueled, and a push rod responsive to the angular movement of said lever for sliding said on-off valve from said closing cylindrical portion into said first cylindrical portion.

* * * * *